United States Patent Office 3,287,286
Patented Nov. 22, 1966

3,287,286
CONTINUOUS PRODUCTION OF FINELY PARTICLED EXPANDABLE STYRENE POLYMERS
Helmut Ohlinger, Wolfgang Guenther, Winfried Single, Karl Buchholz, and Hans Wild, Ludwigshafen (Rhine), Germany, assignors to Badische Anilin- & Soda-Fabrik Aktiengesellschaft, Ludwigshafen (Rhine), Germany
No Drawing. Filed Aug. 20, 1963, Ser. No. 303,429
Claims priority, application Germany, Aug. 29, 1962, B 68,612
4 Claims. (Cl. 260—2.5)

This invention relates to a continuous process for the production of finely particled expandable styrene polymers.

Various methods for the production of expandable styrene polymers are already known. Thus styrene has been polymerized in pressure containers in the presence of gaseous or liquid expanding agents and the resulting composition reduced in size in crushers and mills after it had been cooled under pressure. Particles having an unequal size and irregular shape are thus obtained which are not well suited to the production of expanded plastics articles.

It is also known to prepare finely particled expandable styrene polymers by polymerization of styrene in the presence of expanding agents in aqueous suspension. A disadvantage of this is that such suspension polymers can be obtained only by batch methods. Moreover it is difficult to prepare colored polymers by this method by polymerization of the monomers in the presence of dyes because such suspensions have a strong tendency to coagulate. Furthermore the dyes partly pass from the suspended mixture of monomers and polymers into the aqueous phase during the polymerization.

It has also been proposed to mix styrene polymers with gaseous or liquid expanding agents in extruders and to reduce in size the homogeneous composition thus obtained. Complicated apparatus and a large amount of mechanical energy are however required for the production of a homogeneous mixture of polymer and expanding agent by the said method.

The object of this invention is to provide a continuous process for the production of finely particled expandable styrene polymers. This object is achieved by introducing styrene or a mixture of monomeric styrene with one or more other α-ethylenically unsaturated monomeric compounds capable of being copolymerized with styrene, and an organic compound which is liquid or gaseous at standard temperature and pressure, which does not dissolve or only swells the styrene polymer obtained by polymerizing the styrene or mixture of monomers, and which has a boiling point lower than the softening point of the styrene polymer, continuously into the top of a pressure vessel having a diameter smaller than its height, polymerizing the styrene or the monomer mixture, the temperature at the top of the pressure vessel being between 70° C. and 130° C. and at the bottom of the pressure vessel between 170° C. and 230° C. and the pressure in the pressure vessel being more than the vapor pressure of the organic compound and the monomers at the temperature prevailing at the bottom of the vessel, and continually discharging the composition of styrene polymer and organic compound at the bottom of the vessel at a rate at which the monomers and organic compound are supplied to the top of the pressure vessel, cooling the compound thereafter to 20° C. to 65° C. and reducing it in size.

The term styrene polymer as used in this specification includes polystyrene and copolymers of styrene. Suitable copolymerization components are α-ethylenically unsaturated monomeric polymerizable compounds which can be copolymerized with styrene. The mixture of monomers should contain at least 50% by weight of styrene. Examples of suitable copolymerization components are α-methylstyrene, nuclear methylstyrene, acrylonitrile, vinylcarbazole, esters of acrylic acid and methacrylic acid with alcohols having one to eight carbon atoms, and esters of fumaric acid and maleic acid with alcohols having one to eight carbon atoms. Moreover small amounts of crosslinking components, such as divinylbenzene, 1,4-butanediol diacrylate, butadiene or isoprene, may be added to the monomer mixture for the preparation of the polymers.

The monomers may also be polymerized in the presence of a polymer of ethylenically unsaturated monomeric polymerizable compounds. Such solutions of monomers and polymers may contain polymers of the same monomers as are used for the polymerization or other monomers. Thus for example solutions of styrene and polystyrene or of styrene and polybutadiene, polyisoprene, or of styrene-butadiene copolymers containing between 20 and 80% by weight of styrene in polymerized form, may be processed into expandable styrene polymers by the process according to this invention.

Suitable expanding agents are organic compounds which are gaseous or liquid at standard temperature and pressure and which do not dissolve the styrene polymer or only slightly swell it and do not react with the styrene polymer or disturb the course of the polymerization, and which have a boiling point which is lower than the softening point of the styrene polymer. In general, the expanding agents have boiling points higher than −45° C. Examples of suitable compounds are aliphatic hydrocarbons, such as propane, butane, pentane, hexane, propylene, butene and perchlorofluorocarbons, such as dichlorodifluoromethane, 1,2,2-trifluoro - 1,1,2-trichloroethane. The expanding agents are added to the polymerization mixture in such amounts that the styrene polymer obtained after the process contains between 3 and 15% by weight of expanding agent. Mixtures of these compounds may also be used. The softening point should be taken to be the temperature determined by the method of Vicat (DIN test specification No. 57,302).

The polymerization vessel may be of conventional construction such as is used for example in the continuous production of polystyrene. It is a vertical pressure vessel having a diameter smaller than its height. The ratio of diameter to height may be between 1:100 and 1:5. A polymerization vessel of this kind forms the subject-matter of German patent specification No. 634,278.

The monomers or the solutions of polymers and monomers are introduced at the top of the pressure vessel. Solutions of monomers and polymers may be obtained for example by dissolving polymers in monomers. It is also possible to subject monomers to a preliminary polymerization in a separate vessel. The expanding agent may be supplied to the pressure vessel together with the monomers or separately. It is advantageous to add the expanding agent at the top of the pressure vessel. The expanding agent may also be introduced into the mixture to be polymerized at other points in the pressure vessel. The mixture being polymerized may be stirred by means of flat blade paddle agitators, straight arm paddle agitators, anchor agitators or finger paddle agitators. The residence period of the mixture being polymerized in the pressure vessel is regulated so that the monomers are completely polymerized when the composition has reached the bottom of the pressure vessel. The residence period can be controlled by regulating the rate of supply of the monomers or the rate of discharge of the composition obtained. Polymerization is carried out at temperatures between 70° C. and 230° C. It is advantageous to control the temperatures in the pressure vessel so that the temperature at the top of the vessel is lower than in the bottom portion of the vessel. It should be between 70° C. and 130° C. at the top of the vessel and between 170° C. and 230° C. at the bottom. The pressure in the polymerization vessel should be higher than the vapor pressure of the expanding agent and of the monomers at the temperature prevailing at the bottom of the vessel.

It is advantageous to regulate the pressure in the pressure vessel by forcing in inert gases, such as nitrogen. It is advantageous to choose pressures between 5 and 40 atmospheres gauge.

The monomers are polymerized either purely thermally or by means of polymerization initiators, for example compounds which decompose to free radicals under the conditions of the polymerization, such as peroxides or azo compounds. Substances which regulate the course of the polymerization, such as mercaptans or dimeric α-methylstyrene, may also be added to the polymerization mixture.

Dyes, pigments, flameproofing agents, lubricants, plasticizers or stabilizers may be incorporated with the mixture to be polymerized.

The composition consisting of expanding agent and styrene polymer is discharged at the bottom of the vessel. It is discharged at a rate equal to that at which the monomers and organic compound are supplied to the top of the pressure vessel. In a simple case, the composition is extruded through a die under the pressure prevailing in the reactor. It is advantageous however to force the highly viscous composition through a die by means of a suitable discharge means, such as a screw conveyor or a gear pump. It is particularly advantageous to extrude the highly viscous thermoplastic composition through a die lined with or formed of polytetrafluoroethylene direct into a cooling bath in which it is cooled. The cooling bath may advantageously contain water or an aqueous salt solution. The temperature of the cooling bath is kept low enough to prevent expansion of the composition. The composition of styrene polymer and expanding agent is thus advantageously cooled to between 20° C. and 65° C. The strings or strips are then broken up. They may be withdrawn for example by pairs of rollers and after they have cooled sufficiently for expansion not to occur, they are granulated by conventional methods, for example with rotating cutters. It is also possible to force the thermoplastic composition through dies into a pressure chamber in which the prevailing pressure is higher than the vapor pressure of the expanding agent used. The issuing strings or strips are cooled and broken up inside the pressure chamber and then discharged through discharge gates.

The expandable styrene polymers obtained by the process according to this invention may be processed into expaned plastics articles by conventional methods.

The invention is illustrated by the following examples.

*Example 1*

3 kg. of a solution of 95 parts of styrene and 5 parts of n-pentane is introduced per hour continuously by means of a metering pump into a pressure vessel having a diameter of 20 cm. and a height of 300 cm. Nitrogen is forced in until the pressure is 30 atmospheres gauge. The vessel is kept at a temperature of 100° C. in the upper portion and at a temperature of 180° C. in the lower portion. 3 kg. per hour of a homogeneous mixture of polystyrene and pentane is withdrawn by means of a gear pump at the bottom of the vessel and forced through a copper die lined internally with tetrafluoroethylene into a waterbath. The mixture is cooled to about 120° C. in the gear pump. The polymer is discharged from the die in the form of endless filaments which are cooled in the waterbath to about 60° C. and then broken up into cylinders about 1 mm. in length by means of a granulator.

The cylindrical particles obtained may be expanded in the conventional way by heating with hot water or steam and processed into shaped articles in molds which are not gastight when closed.

A mixture of 90 parts of styrene, 10 parts of ethyl acrylate and 5 parts of n-butane or propane may be polymerized in the same way. In this case the filaments are cooled in the waterbath to 30° C.

*Example 2*

4 kg. per hour of styrene is introduced into a vessel of 60 liters capacity which is fitted with stirring means and kept at 89° C. At the same time, 4 kg. per hour of the contents of the vessel is withdrawn. In this way a solution of styrene and polystyrene is obtained having a polystyrene content of about 18%. The solution withdrawn is pumped into a pressure vessel 500 cm. in height and 20 cm. in diameter in which a pressure of 30 atmospheres gauge is maintained with nitrogen. 0.28 kg. per hour of pentane is also introduced at the top of the pressure vessel. The upper portion of the vessel is kept at 100° C. and the lower portion at 190° C. Continuous discharge and granulation of the expandable polystyrene thus obtained is carried out as described in Example 1. The granulate thus prepared may be expanded in the conventional ways.

*Example 3*

3.5 kg. of a 5% solution of a copolymer of 60 parts of butadiene and 40 parts of styrene having a K-value of 98 in styrene is introduced into a vessel having stirring means in the manner described in Example 2. The contents of the vessel are kept at a temperature of 100° C. 3.5 kg. of the contents of the vessel is supplied per hour to the pressure described in Example 2. 20% of the styrene is polymerized in the stirrer vessel. The mixture supplied to the pressure vessel contains the butadiene-styrene copolymer heterogeneously distributed. 0.200 kg. of heptane per hour is also introduced into the vessel. Polymerization, discharge and size reduction of the resultant composition are carried out as described in Example 2. When the resultant expandable particles are expanded in gas-permeable molds, expanded plastics articles having particularly good mechanical properties are obtained.

*Example 4*

4 kg. of a 6% solution in styrene of 1,4-cis-polybutadiene having a K-value of 104 is introduced in the way described in Example 2 into a vessel fitted with a stirrer. The contents of the vessel are kept at a temperature of 110° C. 4 kg. per hour of the contents of the vessel is pumped with the aid of a gear pump together with 0.250 kg. per hour of pentane into a pressure vessel having a diameter of 20 cm. and a height of 400 cm. and polymerized and broken up into a granulate in the way described in Example 2.

Expanded articles prepared from this product by conventional methods retain their good mechanical properties down to temperatures of −30° C.

It is also possible to use a pressure vessel having a height of 1000 cm. and a diameter of 20 cm.

*Example 5*

2.5 kg. per hour of a mixture of 75% by weight of styrene and 25% by weight of acrylonitrile and 0.28 kg. per hour of monofluorotrichlormethane are introduced into a pressure vessel as described in Example 1. The upper half of the vessel is kept at a temperature of 80° C. and the lower half at a temperature of 190° C. 2.78 kg. per hour of the polymerized mixture is discharged at the lower end of the vessel. The mixture is cooled to about 125° C. in the screw and discharged and broken up as described in Example 1.

Mixtures of 90 parts of styrene and 10 parts of methyl methacrylate may be polymerized in the same way, and 1,2,2-trifluoro-1,1,2-trichloroethane may be used as the expanding agent.

We claim:

1. A process for the production of finely particled expandable polystyrene wherein styrene and an organic compound selected from the group consisting of aliphatic hydrocarbons and perchlorofluorocarbons which has a boiling point lower than the softening point of polystyrene, but above −45° C. is continuously introduced at the top of a pressure vessel having a diameter less than its height, the styrene is polymerized with the temperature at the top of the pressure vessel being between 70° and 130° C. and at the bottom between 170° and 230° C. and the pressure in the pressure vessel being more than the vapor pressure of the organic compound and styrene at the temperature prevailing at the bottom of the vessel, the composition comprising polystyrene and organic compound is continually discharged at the bottom of the pressure vessel at a rate equivalent to that at which the styrene and organic compound are supplied at the top of the pressure vessel, and the composition is cooled to 20° to 65° C. and then reduced in size.

2. A process for the production of finely particled expandable styrene polymers wherein a mixture of monomers comprising styrene and a member selected from the group consisting of α-methylstyrene, esters of acrylic and methacrylic acid with 1 to 8 carbon atoms and acrylonitrile and an organic compound selected from the group consisting of aliphatic hydrocarbons and perchlorofluorocarbons which has a boiling point lower than the softening point of the styrene polymer, but above −45° C. is continuously introduced at the top of a pressure vessel having a diameter less than its height, said mixture of monomers is polymerized with the temperature at the top of the pressure vessel being between 70° and 130° C. and at the bottom between 170° and 230° C. and the pressure in the pressure vessel being more than the vapor pressure of the organic compound and said mixture of monomers at the temperature prevailing at the bottom of the vessel, the composition comprising styrene polymer and organic compound is continually discharged at the bottom of the pressure vessel at a rate equivalent to that at which said mixture of monomers and organic compound are supplied at the top of the pressure vessel, and the composition is cooled to 20° to 65° C. and then reduced in size.

3. A process as claimed in claim 1 wherein the polymerization of styrene is carried out in the presence of a polymer selected from the group consisting of polystyrene, 1,4-cis-polybutadiene, and copolymers of styrene and butadiene.

4. A process as claimed in claim 2 wherein the polymerization of styrene is carried out in the presence of a polymer selected from the group consisting of polystyrene, 1,4-cis-polybutadiene, and copolymers of styrene and butadiene.

No references cited.

MURRAY TILLMAN, *Primary Examiner.*

M. FOELAK, *Assistant Examiner.*